Feb. 24, 1970          E. E. FOSTER          3,496,659
MOBILE IRONING APPARATUS
Filed May 6, 1968          9 Sheets-Sheet 1
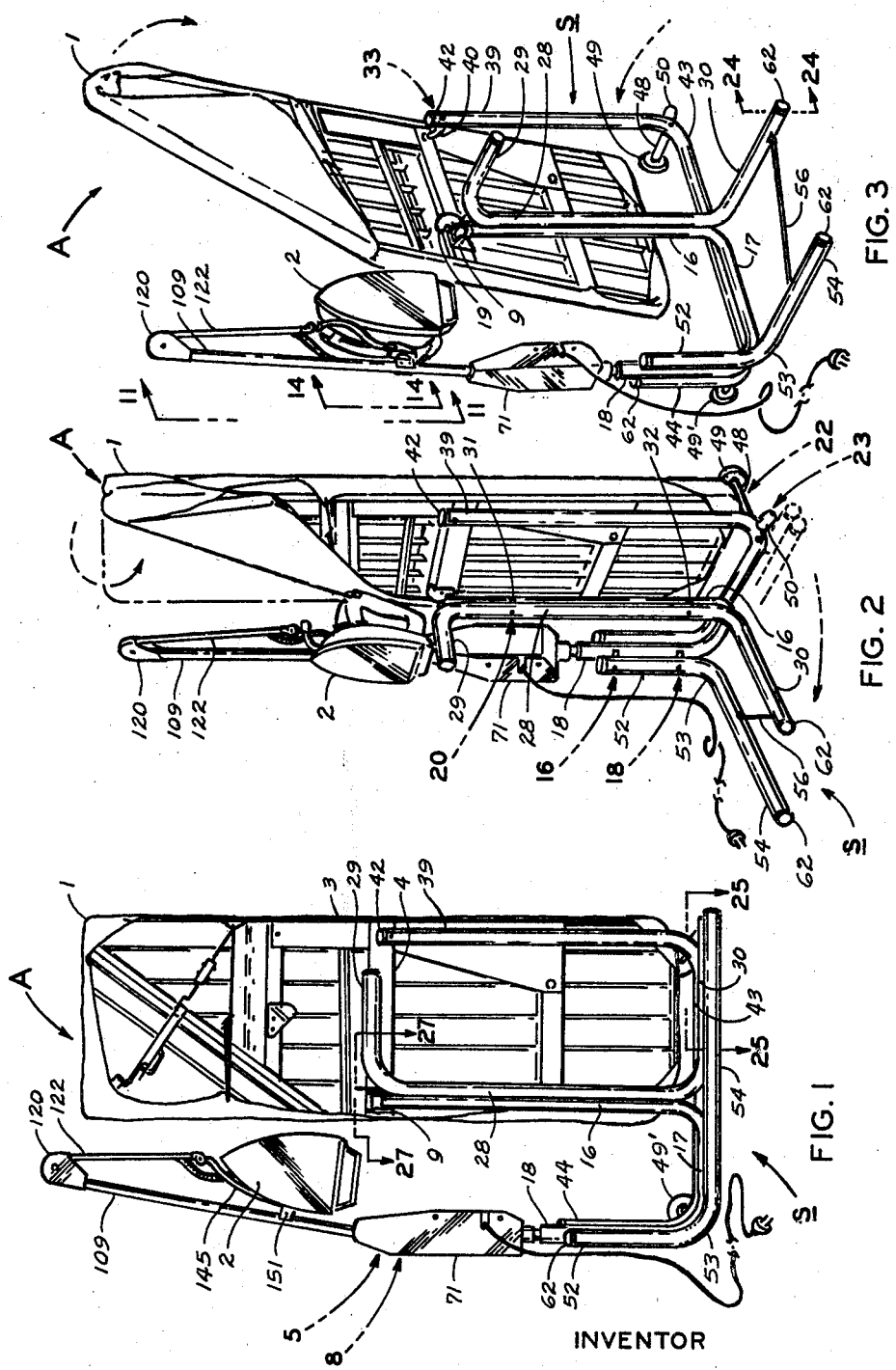
INVENTOR
EDWIN E. FOSTER
BY *Ralph W. Kalish*
ATTORNEY Feb. 24, 1970    E. E. FOSTER    3,496,659
MOBILE IRONING APPARATUS
Filed May 6, 1968    9 Sheets-Sheet 2
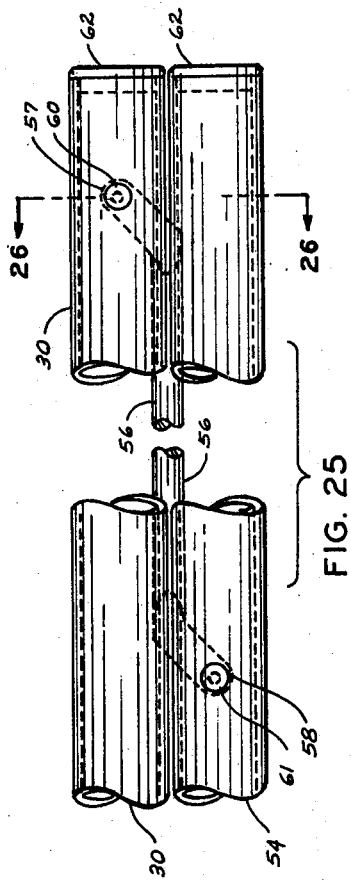
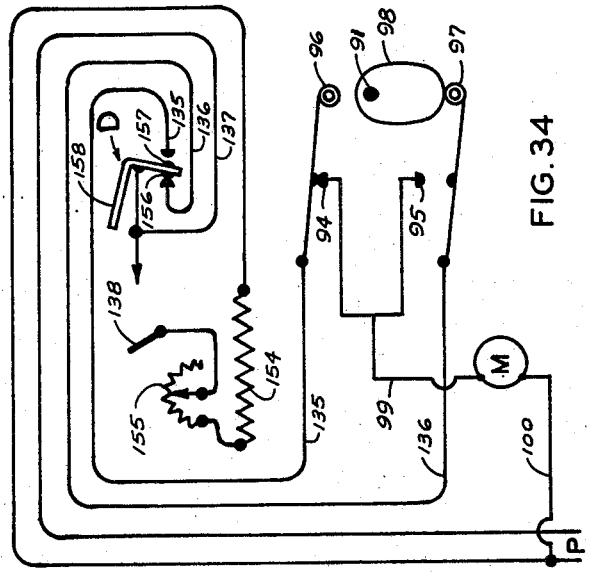
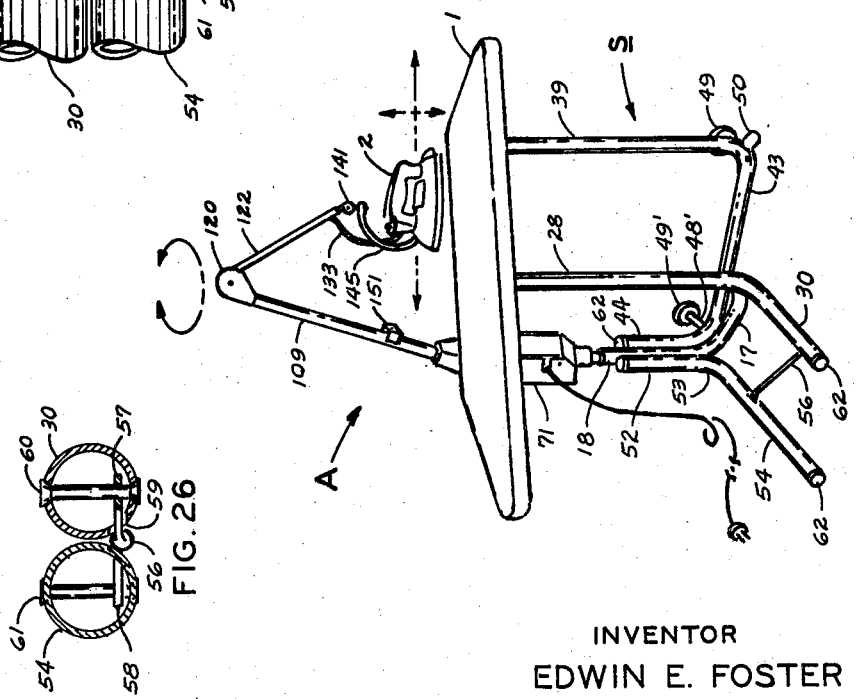
INVENTOR
EDWIN E. FOSTER
BY *Ralph W. Kalish*
ATTORNEY

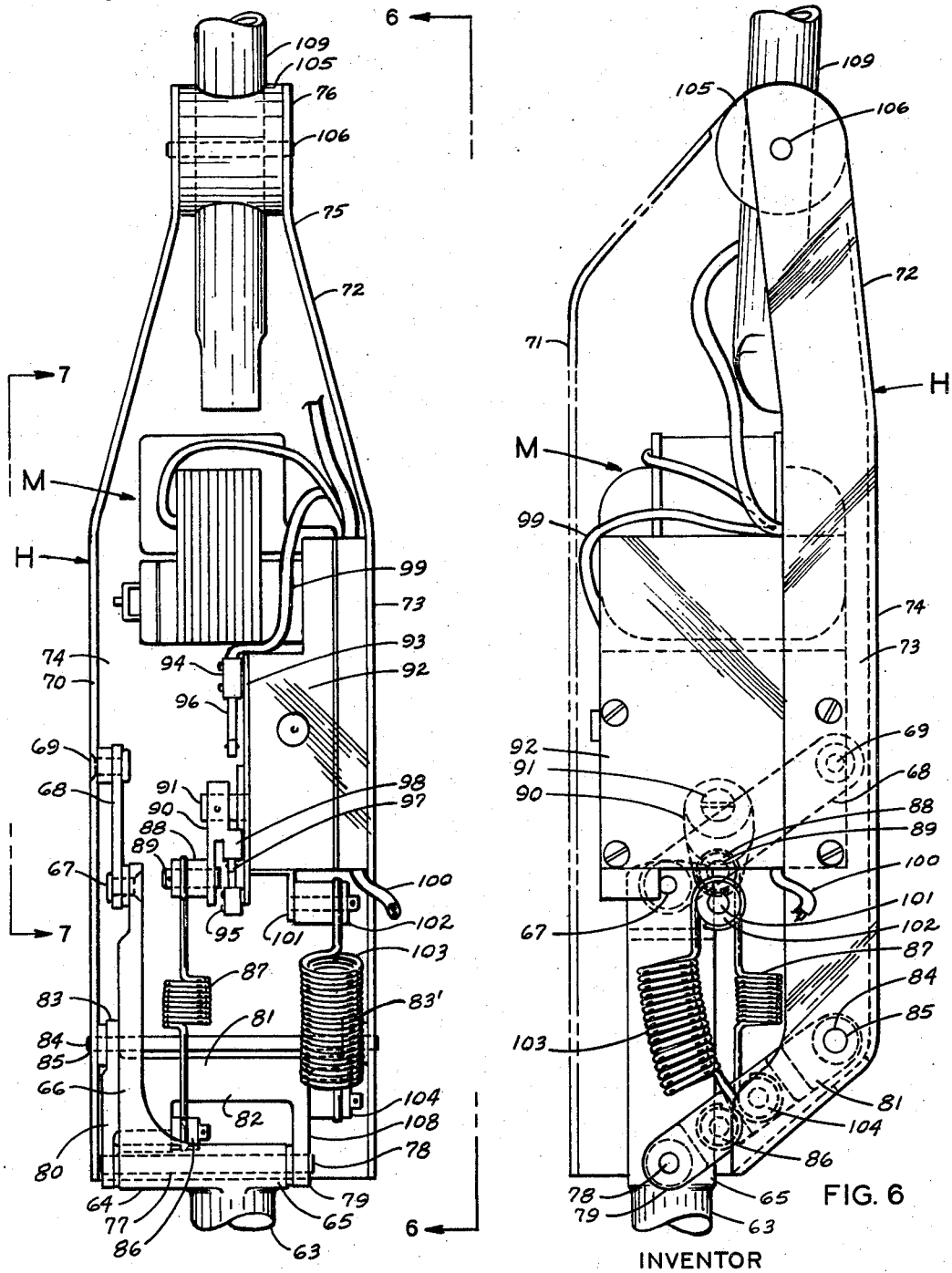

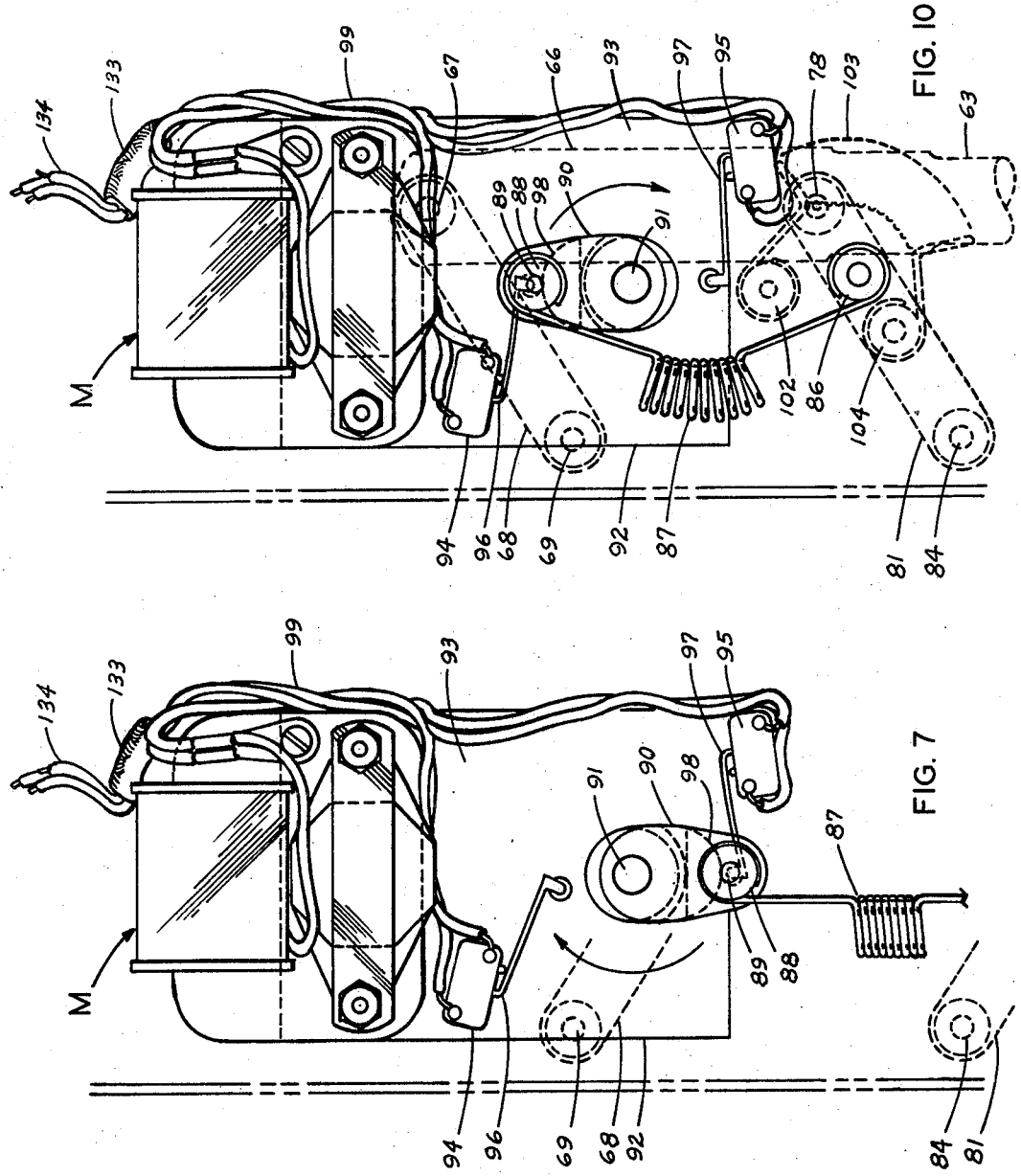

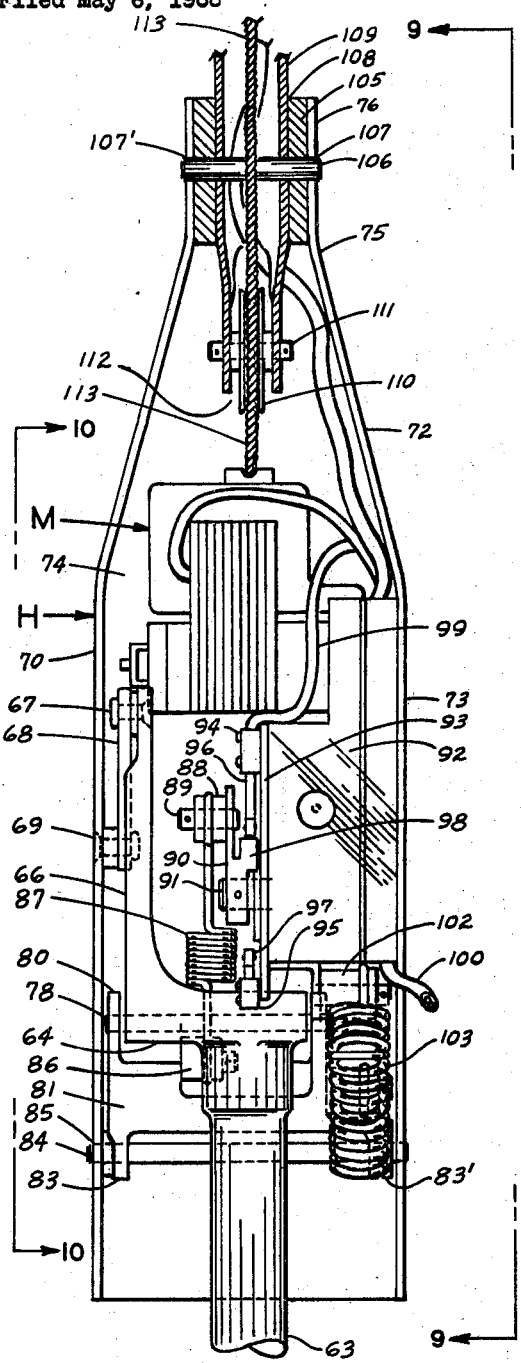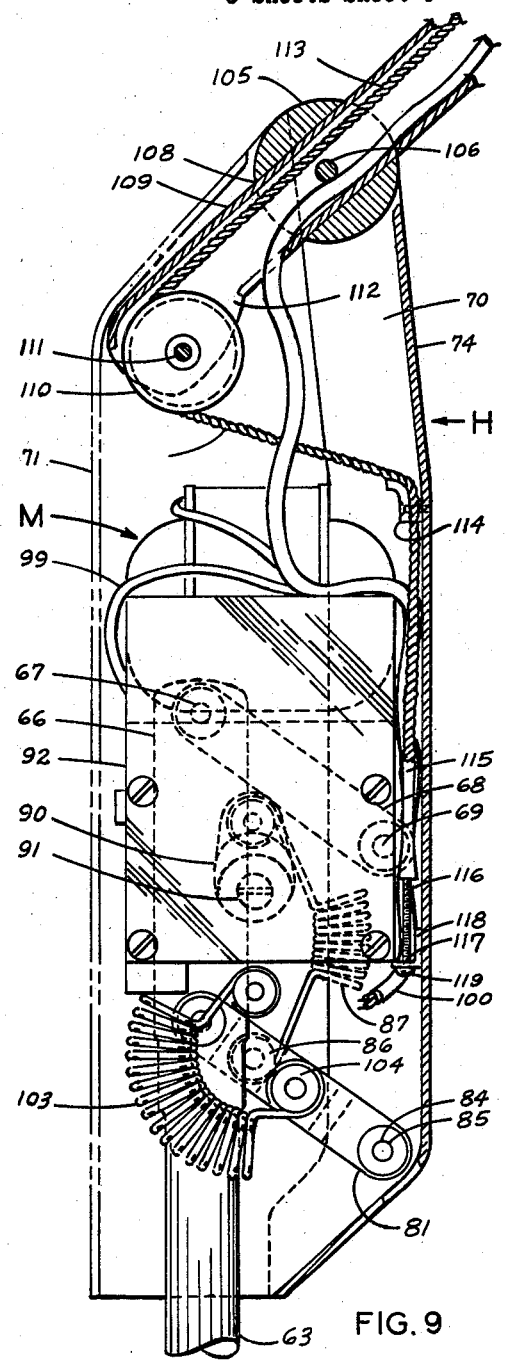
FIG. 8
FIG. 9
INVENTOR
EDWIN E. FOSTER
BY Ralph W. Kalish
ATTORNEY

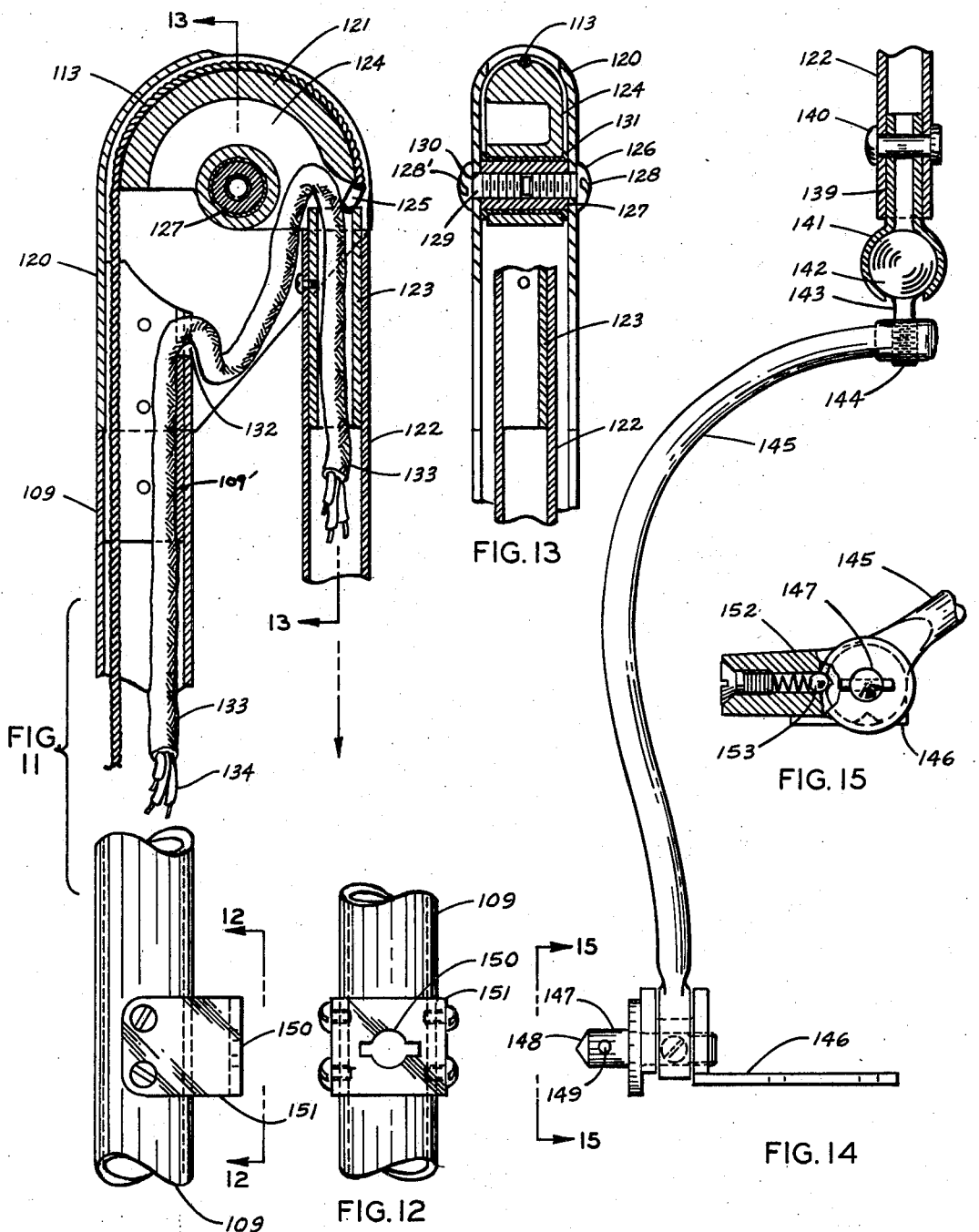

Feb. 24, 1970   E. E. FOSTER   3,496,659
MOBILE IRONING APPARATUS
Filed May 6, 1968   9 Sheets-Sheet 7
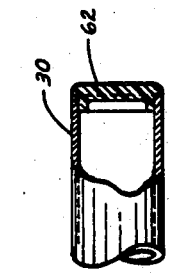
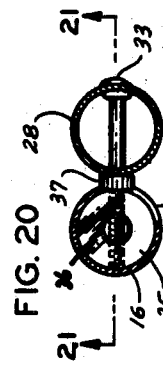
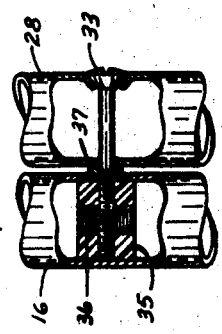
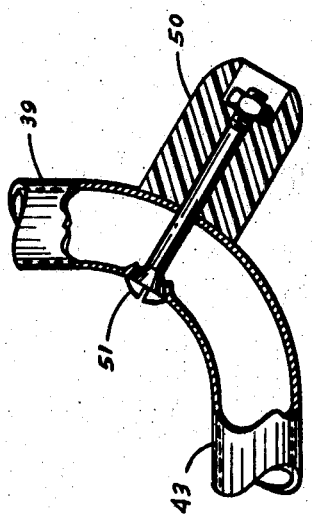
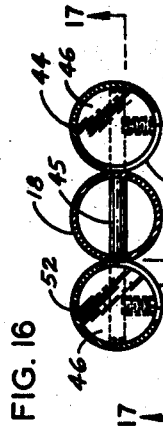
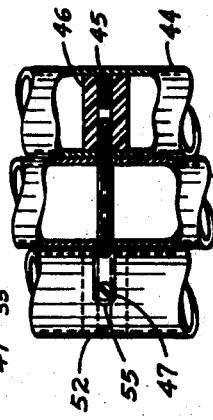
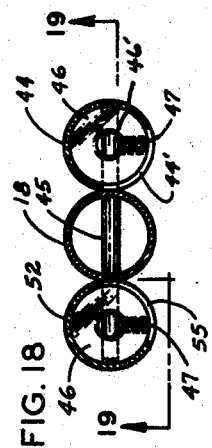
INVENTOR
EDWIN E. FOSTER
BY Ralph W. Kalish
ATTORNEY Feb. 24, 1970  E. E. FOSTER  3,496,659
MOBILE IRONING APPARATUS
Filed May 6, 1968  9 Sheets-Sheet 8

INVENTOR
EDWIN E. FOSTER
BY *Ralph W. Kalish*
ATTORNEY

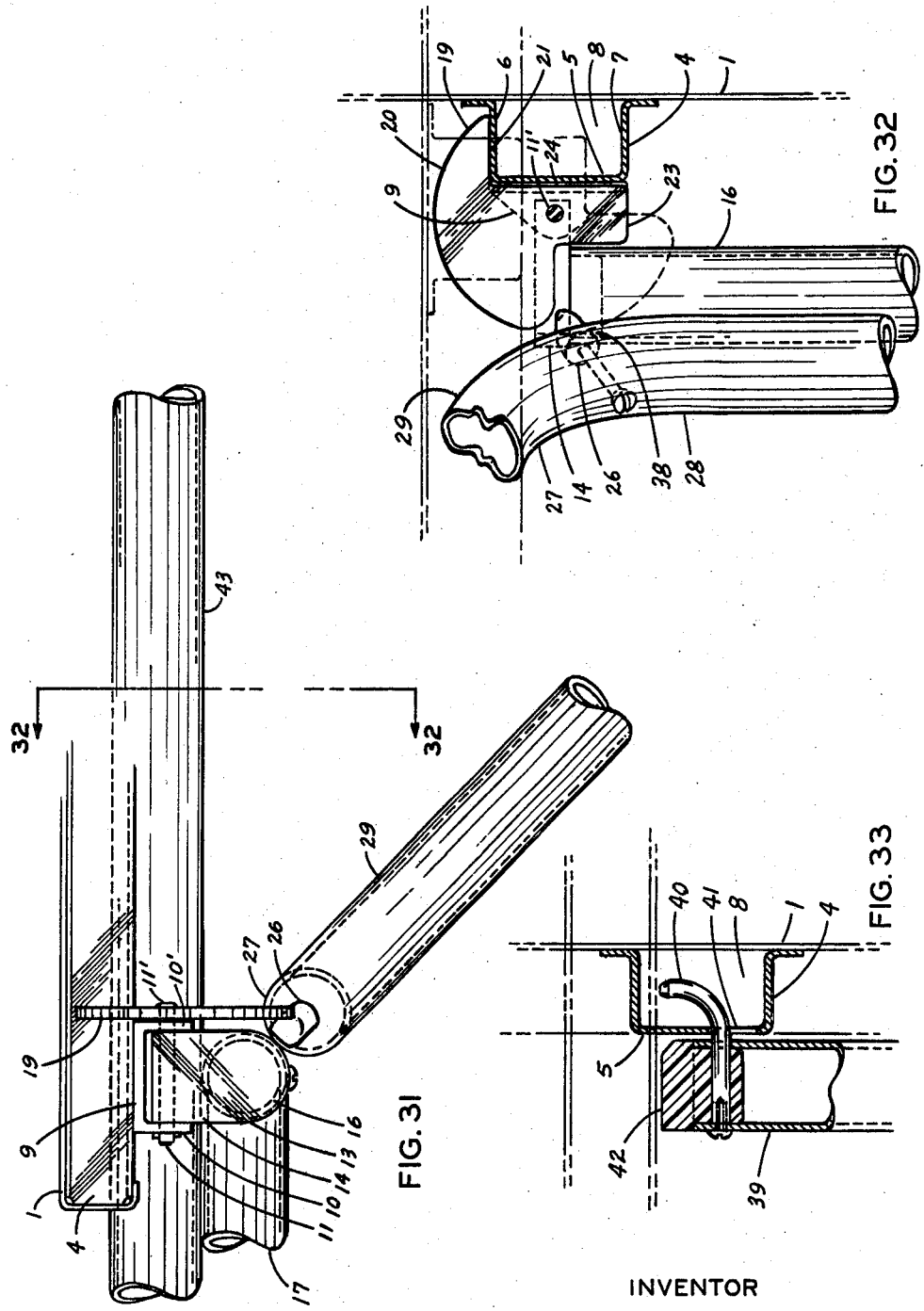

United States Patent Office 3,496,659
Patented Feb. 24, 1970

3,496,659
MOBILE IRONING APPARATUS
Edwin E. Foster, Austin, Tex., assignor to Majik-Ironers, Inc., Austin, Tex., a corporation of Texas
Filed May 6, 1968, Ser. No. 726,866
Int. Cl. D06f 71/00
U.S. Cl. 38—30                                              9 Claims

ABSTRACT OF THE DISCLOSURE

An ironing apparatus comprising a standard adapted to support an ironing board and having an arm for carrying an iron; said support being adapted for movement between collapsed or inoperative condition wherein the board is vertically disposed and operative condition wherein the board is presented horizontally for use. Motor and spring means for causing the iron to automatically be lifted from the board upon cessation of usage of the iron; there being novel latch means for maintaining the support in operative condition against accidental collapsing action.

Background of the invention

Heretofore, numerous efforts have been made to develop a composite ironing apparatus which includes an ironing board, means for supporting same and an arm-carried iron. However, such previous developments have not produced in apparatus which has met requisite functional consistency. As the apparatus is designed for household use the same must be easily manipulated for movement between operative and inoperative condition so as to occasion no strain upon the user and such apparatus must necessarily be proof against accidental collapsing during usage so as to avoid any untoward injury. Furthermore, ironing devices of this character must likewise be so constructed that the user is spared the necessity of lifting a customary heavy iron at the completion of such particular ironing act in order to avoid fatigue as well as difficulty in use.

Therefore, it is an object of the present invention to provide an ironing apparatus which comprehends in a compact unit, an ironing board with a support therefor and an iron disposed immediately above said board.

It is another object of the present invention to provide a compact ironing apparatus which is of limited weight and which is adapted for mobility so as to allow for ease of handling by the average housewife.

It is a further object of the present invention to provide an ironing apparatus of the type stated including novel latch means which automatically secure the ironing board support in operative position thereby preventing inadvertent accidental collapse with consequent injury to the user.

It is a further object of the present invention to provide an ironing apparatus of the character stated incorporating novel control for effecting the automatic raising of the iron upon interruption of use, which means are operable by a switch conveniently located on the iron.

Another object of the present invention is to provide an ironing apparatus of the character stated which, when in collapsed or inoperative condition, consumes minimum space so that the same may be readily stored against future usage.

It is a still further object of the present invention to provide an ironing apparatus of the character stated which is of simple construction having a minimum of parts which are fabricated from durable materials; which apparatus is reliable in usage; which is economical in production; which is easily utilized; and which is so constructed as to avoid various of the hazards heretofore inherent in currently available ironing devices.

Brief description of the drawings

FIGURE 1 is an elevational view of a mobile ironing apparatus constructed in accordance with and embodying the present invention, illustrating same in inoperative, collapsed condition.

FIGURE 2 is a perspective view of the ironing apparatus illustrating same at a juncture is the movement of same into operative condition.

FIGURE 3 is a perspective view illustrating the ironing apparatus with the standard in full open or operative condition.

FIGURE 4 is a perspective view of the ironing apparatus in operative condition.

FIGURE 5 is a vertical view taken in the area indicated by the numeral 5 in FIGURE 1 and illustrating the iron lowering and raising mechanism in iron-raised position, with part of the casing being removed.

FIGURE 6 is a side view as taken on the line 6—6 of FIGURE 5.

FIGURE 7 is a side view as taken on the line 7—7 of FIGURE 5.

FIGURE 8 is a vertical view taken substantially in the zone indicated at 8 in FIGURE 1, but showing the mechanism in iron-lowered position.

FIGURE 9 is aside view as taken on the line 9—9 of FIGURE 8.

FIGURE 10 is a side view as taken on the line 10—10 of FIGURE 8.

FIGURE 11 is an enlarged view, partially in section, taken on the line 11—11 of FIGURE 3.

FIGURE 12 is a fragmentary side view as taken on the line 12—12 of FIGURE 11.

FIGURE 13 is a fragmentary transverse sectional view as taken on the line 13—13 of FIGURE 11 but omitting the conductor.

FIGURE 14 is a side view as taken on the line 14—14 of FIGURE 3.

FIGURE 15 is a side view, in partial section, as taken on the line 15—15 of FIGURE 14.

FIGURE 16 is a horizontal transverse sectional view a staken in the zone indicated at 16 in FIGURE 2.

FIGURE 17 is a vertical transverse sectional view taken on the line 17—17 in FIGURE 16.

FIGURE 18 is a horizontal transverse sectional view taken in the zone indicated at the numeral 18 in FIGURE 2.

FIGURE 19 is a vertical transverse sectional view taken on the line 19—19 of FIGURE 18.

FIGURE 20 is a horizontal transverse sectional view taken in the zone indicated at the numeral 20 in FIGURE 2.

FIGURE 21 is a vertical transverse sectional view taken on the line 21—21 of FIGURE 20.

FIGURE 22 is an enlarged view, partially in section, taken in the zone indicated at numeral 22 in FIGURE 2.

FIGURE 23 is an enlarged fragmentary view, partially in section, taken in the zone indicated at the numeral 23 in FIGURE 2.

FIGURE 24 is a transverse sectional view taken on the line 24—24 of FIGURE 3.

FIGURE 25 is a top view as taken on the line 25—25 of FIGURE 1.

FIGURE 26 is a vertical transverse sectional view taken on the line 26—26 of FIGURE 25.

FIGURE 31 is a top view taken substantially on the line 27—27 of FIGURE 1, but illustrating the support member in operative disposition.

FIGURE 32 is a side elevational view taken substantially on the line 32—32 of FIGURE 31.

FIGURE 33 is a vertical transverse sectional view taken in the zone indicated by the numeral 33 in FIGURE 3.

FIGURE 34 is a wiring diagram of the control circuit.

Description of the preferred embodiment

Figure 30:
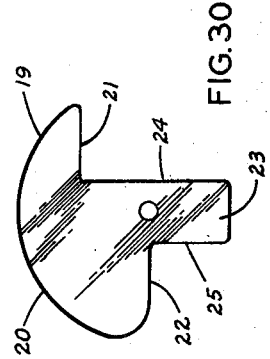
FIGURE 30 is a plan view of the latching cam.

Referring now by reference characters to the drawings which illustrate the preferred embodiment of the present invention, A indicates an ironing apparatus comprising generally an ironing board 1, a standard or support structure, designated s, and an iron 2 carried in a manner to be described hereinbelow by an arrangement of arms supported by standard s.

Figure 29:
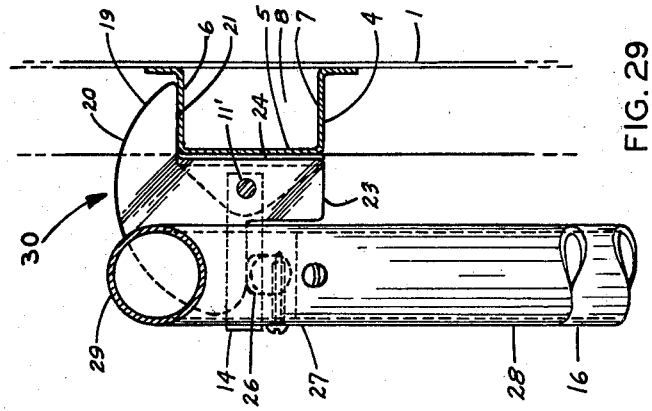
FIGURE 29 is a side elevational view as taken on the line 29—29 of FIGURE 28.

Ironing board 1 is of customary rectangular shape incorporating a rigid frame 3 which comprehends a cross bar 4 extending transversely of said frame 3 and being located substantially intermediate the ends thereof; said bar 4 thus being disposed upon the under surface of said board 1 when the latter is in horizontal, operative disposition (FIGURE 4). As may best be seen in FIGURES 29 and 32 cross bar 4 is gentrally of channel form, being preferably of metallic construction, so as to have a web 5 parallel to the surface of board 1 and side flanges 6, 7 being presented in normal planar relationship thereto with the latter thus defining an interior volume or spacing, as at 8.

Secured upon web 5 of cross bar 4 proximate the inner end thereof (that is, toward the left hand side of FIGURE 1), is a U-shaped mounting bracket 9 having flanges 10, 10', which latter are suitably apertured for receiving the ends of a pivot pin 11 extending transversely therebetween. Said pin 11 projects through a bore 12 provided in a lateral extension 13 of a resilient rest 14 having a plug portion 15 for snug reception within the upper open end of an upright or leg 16 of standard s. Said upright 16 being fabricated preferably of tubular stock, is integral at its lower end with a transverse portion 17 for disposition upon the floor or other support surface and which latter at its opposite end is continuous with an upstanding leg 18 being axially parallel to upright 16 but of relatively less height. As will be shown hereinbelow, ironing board 1 will be caused to pivot about pin 11 in moving to and from operative position, and when in horizontal or operative position will be disposed upon the upper face of rest 14.

Figure 27:
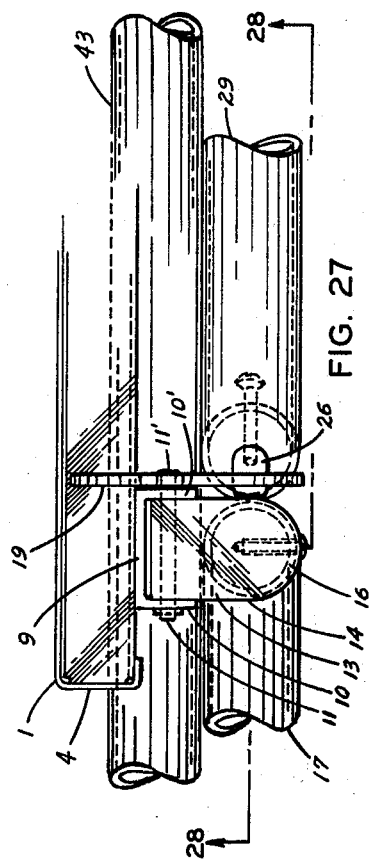
FIGURE 27 is a top fragmentary view as taken on the line 27—27 of FIGURE 1.
Figure 28:
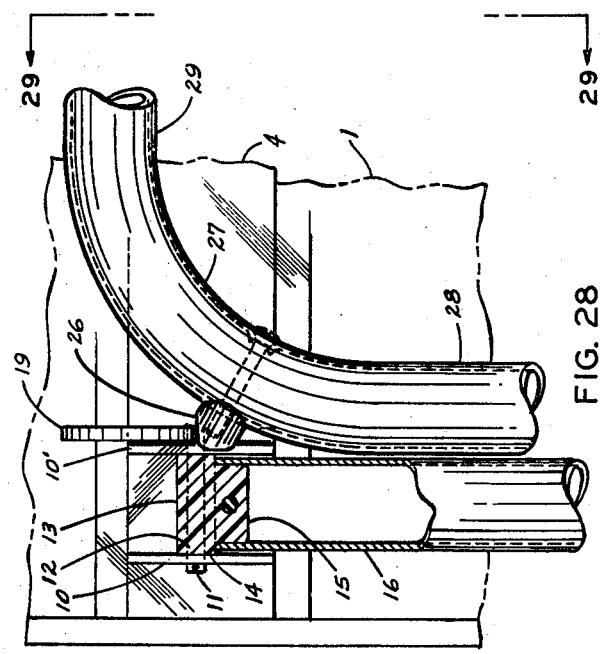
FIGURE 28 is an elevational view, partially in section, taken on the line 28—28 of FIGURE 27.

Pivot pin 11 at its outer end (toward the right hand side of FIGURES 27 and 28) is provided wtih an extension, as at 11', for fixed engagement thereon of a latching cam 19, which latter is thus rotatable with said pin 11. Cam 19 is of relatively thin, plate character having an arcuate operating edge 20 which will be upwardly presented when ironing apparatus A is in inoperative or collapsed condition (FIGURE 1). Continuous with said arcuate edge 20 are upper and lower rectilinear operating edges 21, 22 being disposed on opposite sides of a central tongue-like portion 23 having parallel side faces 24, 25 which are respectively normal to edges 21, 22. Mutually perpendicular edges 21, 22 are presented in abutting relationship to web 5 and flange 6 of cross bar 4 (FIGURE 29) and are of substantially like extent. With apparatus A in inoperative condition, lower rectilinear edge 22 will abut a boss 26 mounted upon a vertically presented support member, indicated generally 27, of U-form having a central vertical component 28 and upper and lower horizontal arms 29, 30 integral therewith; said member 27 being preferably fabricated from tubular stock. Lower horizontal arm 30 is in co-planar relationship with horizontal portion 17 for engaging the floor or other support surface, while upper arm 29, which is co-planar with lower arm 30, is adapted for engaging the under surface of board 1 when the latter is in horizontal, operative position. The central vertical component 28 of said support member 27 is swingably engaged to upright 16 at spaced-apart points, as at 31, 32, as by means of screws 33 (see FIGURE 20) which project through diametrally aligned openings in component 28 and into upright 16 through an arcuate opening therein. Within upright 16, screws 33 are received within bearing plugs 35, fabricated as of plastic, and which are drilled and tapped, as at 36, for facilitating assembly. Disposed upon screws 33 are spacers 37 which are received within the related arcuate recess 34 so that screws 33 may be tightened as necessary without restricting the pivotal action. As may best be seen in FIGURES 27 and 28, support member 27 will be presented with its upper and lower arms 29, 30 in immediate contiguity with the normally under face of ironing board 1 so that said support member 27 will lie within a plane parallel to that of ironing board 1. As indicated above, boss 26 is so mounted on member 27 that when said latter is in the aforesaid condition, boss 26 will abut rectilinear edge 22 of cam 19.

In moving member 27 into extended condition, as indicated in FIGURE 2, as by the user pulling upon upper arm 29 so that member 27 will swing about upright 16, boss 26 will be moved from engagement with latch 19, as shown in FIGURES 31, 32 so that ironing board 1 may be freed for downward swinging with arcuate edge 20 of latch cam 19 moving past boss 26 into the position indicated in dotted lines in FIGURE 32. It is, of course, understood that the arc of swing requisite for boss 26 to clear cam 19 may be readily adjusted but it has been found desirable that such path traverse an angle of approximately 47½ degrees. With support member 27 swung into full open condition as shown in FIGURES 3 and 4 and with board 1 horizontal, cam 19 will confront on its inner side face (toward the left of FIGURES 27 and 28) both upright 16 and vertical component 28, as in the region indicated at 38 in FIGURE 32, so as to prevent any return movement of support member 27 to collapsed condition before board 1 is swung upwardly. Thus, the radial extent of cam 19 being the distance betwen pivot pin 11 and the periphery of arcuate edge 20 is such as to assure of the detent character of the side faces thereof when board 1 is in down position. Thus, cam 19 uniquely co-acts with boss 26 and support member 27 so as to automatically maintain board 1 in its selected position, thereby protecting the user against any inadvertent accidental movement of board 1 and precluding premature swinging of support member 27.

Provided spacedly of upright in axially parallel relationship therewith is an upright or post 39 being connected at its upper end to transverse bar 4 in its outer portion (toward the right hand side of FIGURE 1) as by means of a J-hook 40 which will extend through opposed openings in the upper end of post 39 for projection of its arcuate end through an opening 41 in web 5 of bar 4 when board 1 is in vertical or inoperative position thereby maintaining same against undesired disengagement. When board 1 is swung into horizontal or operative position, J-hook 40 will lose engagement with said bar 4 so that there is no inhibition to such free movement for operative purposes. However, engagement will be readily established upon return to vertical position. Received within the upper end of post 3 is a resilient plug 42 upon which board 1 rested when in down position. At its lower end post 3 is continuous with a horizontal section 43 presented for disposition upon the support surface, being co-planar with horizontal portion 17 and at its opposite end horizontal section 43 is integral with a relatively short upright 44 in juxtaposition to one side face of leg 18 (see FIGURES 16, 18). Upright 44 is connected to leg 18, as by means of vertically spaced-apart pins, as 45; which extend through arcuate recesses 44' formed in said uprights 44 so that uprights 44, together with the integrated structure comprising post 39 and horizontal section 43 may be swingable about leg 18 for presentation into the position shown in FIG- URE 4 for appropriate support if ironing board 1 when in operative position. Pins 45 are received within bearing plugs 46 disposed within uprights 44 and maintained by retaining screws, as at 49; said plugs 46 are grilled and tapped, as at 46', for facilitating assembly. At the lower end of post 39 and upright 44 for projection perpendicularly therefrom in a direction toward ironing board 1 when the latter is in vertical or upright position, are axle members 48, 48', respectively, which, at their remote ends, mount rollers or casters 49, 49', respectively, for engaging support surface to lend stability to apparatus A when in inoperative condition and to endow same with mobility for ready transport to and from storage or work locations. Projecting outwardly from the lower end of post 39, that is, toward the right hand side of FIGURE 1, is a stop 50, fabricated of rubber or like material, engaged to said post 39, as by an elongated screw or bolt 51 of general carriage character. Said stop 50 abuts on its lower end against the support surface to further rectify apparatus A in its selected disposition.

Secured to the side face of leg 18 opposite that to which upright 44 is secured, is the vertical leg 52 of an angle shaped support 53 having a lower horizontal portion 54 continuous with said vertical leg 52 at its lower end for positionment upon the support surface. Said vertical leg 52 is engaged to leg 18 by pins 45 similarly provided internally with bearing plugs 46 and having retaining screws 47. However, said vertical leg contains arctuate recesses 55 through which pins 45 extend, which recesses permit of ratative movement of vertical legs 52 about their axes with respect to leg 18 so that support 53 may be swung between inoperative condition wheren its horizontal component 54 is immediately adjacent, and in axial parallel relationship, with transverse portion 17, and operative, outwardly swung condition wherein the same is axially perpendicular to said transverse portion 17 as may best be seen in FIGURE 3. Said horizontal portion 54 of support 53 has a length substantially coincident with that of horizontal section 43 with its free end being substantially aligned with the free end of lower horizontal arm 30 when ironing apparatus A is in collapsed condition (FIGURE 1). Lower horizontal arms 30 and horizontal portion 54 of support 53 are interconnected by a link 56 having offset end portions 57, 58 which project through openings, as at 59, within said arm 30 and portion 54 for securement upon pins 60, 61, respectively, which are fixed within said latter members. By means of said link 56 horizontal arm 30 and horizontal portion 54 will be caused to move in unison between folded (FIGURE 2, dotted lines) and open (FIGURE 3) condition. Thus, as the user operates support member 27 through manipulation of upper horizontal arm 29, support 53 will be automatically movable correspondingly since in opening condition, link 56 will tend to push horizontal portion 54 and in closing condition will tend to pull same. As best seen in FIGURE 24, the free ends of horizontal arm 30 and horizontal portion 54, which are open by reason of being desirably made from tubular stock, are provided with end plugs 62.

Thus, in view of the foregoing, it is indeed evident that standard s of ironing apparatus A is most uniquely designed so as to effect easily accomplished and reliable movement into opened condition and returningly to a compact folded state. It is, of course, evident that in lifting the normally upper end of ironing board 1 from horizontal position, cam 19 will be rocked so as to remove its side face from detaining engagement with the confronting portion of support member 27 so that the latter may then be manipulated into folded condition.

Mounted within the open end of leg 18 and extending thereabove is a mounting rod 63 on the upper end of which is integrally formed a crank 64 having a horizontal section 65 axially normal to rod 63 and a vertical extension 66 formed at one end of said horizontal section 65 for extension upwardly thereof. The upper end of extension 66 is engaged by a pin 67 to one end of a link 68, the other end of which is pivotally connected by a pin 69 to a side wall 70 of a housing or casing H; said pin 69 being laterally off-set with respect to the axis of extension 66 (see FIGURE 6). Housing H is formed preferably of sheet metal and is of two-part construction, there being a removable cover plate, as indicated at 71 in FIGURE 1, and a receptacle portion, as indicated at 72 (FIGURE 5) which comprises the aforesaid side wall 70 and a parallel side wall 73 with the same being interconnected by a relatively wide end wall 74 for planarwise parallel relation to closure 71. Housing H tapers or converges in its upper end portion, as set at 75, to a relatively narrow neck 76 which is open at its upper end. Housing H is open at its lower end for receiving rod 63 and crank 64. Horizontal section 65 of crank 64 is provided with a bore 77 for extension therethrough of a shaft 78 which is journaled at its ends within bearings 79 provided at the normally lower ends of side arms 80, 80' integral with a generally H-shaped coupler 81 having a central web portion 82 and with bearings 83, 83' provided in opposite end portions of said side arms 80, 80' for journaling therein of a shaft 84 which projects beyond said side arms 80, 80' for engagement within bearing-forming openings, as at 85, provided in side walls 70, 73, respectively, of housing receptacle 72. With reference to FIGURE 6 it will be seen that bearing-forming openings 85 are so located as to prevent shaft 84 and pivot pin 69 in vertically aligned realationship.

Carried upon coupler 81 between side arm 80, 80' is a mounting 86 to which is suitably secured the lower end of a spring link 87 which is in the form of a constant compression spring, being of the type more fully described in Reissue Patent No. 23,974. The upper end of spring link 87 is engaged about a mounting 88 fixed on a crank pin 89 carried upon a crank 90, which latter is mounted upon a drive shaft 91 projecting from a gear box 92 suitably fixed within housing H. Gear box 92 is operatively connected to a prime mover, indicated M, and also located within housing H and with said shaft 91 being adapted for rotation at a predetermined angular velocity upon energization of prime mover M. Mounted on the side face of gear box 92 adjacent drive shaft 91 is a plate 93 upon which there is mounted a pair of upper and lower micro switches 94, 95, being located on opposite sides of shaft 91 in an opposed manner; said switches having trigger arms 96, 97, respectively, for engagement with a cam 98 fixed on drive shaft 91 for rotation therewith; there being the customary means for normally urging said micro switches 94, 95 into circuit-open condition with closure being effected by engagement between cam 98 and the related trigger arm, 96 or 97 as the case may be, in a manner and for purposes to be shown hereinbelow. Prime mover M is connected to micro switches 94, 95 by a conductor 99 (FIGURES 5 and 34). Said prime mover M is adapted for connection to a source of electrical power by means of a conductor 100 in any conventional manner.

Secured to the under face of gear box 92 is an angle bracket 101, the vertical leg of which carries a mounting 102 about which is secured the upper end of a spring link 103, the lower end of which is engaged to a mounting 104 provided on coupler 81 and projecting laterally outwardly from side arm 80' substantially intermediate its length (FIGURE 5). Said spring link 103 is of the same type as spring link 87 above described.

In view of the foregoing, it will be seen that upon energization of prime mover M, drive shaft 91 will be caused to rotate with consequent rotation of crank 90 to cause the upper end of spring link 87 to be elevated and then lowered. Thus, in elevated position (as may be seen in FIGURE 8) said spring link 87 will cause an upward rocking of coupler 81 about shaft 84 with consequent travel upwardly of rod 63 relatively within housing H; and when in lowered position, that is, 180 degrees from elevated position, said spring link will effect a downward pushing upon coupler 81 so that the same will be rocked in a counterclockwise direction, as viewed in FIGURE 9 so as to cause rod 63 to be relatively lowered with respect to housing H for purposes presently appearing.

Simultaneously with such rotation of shaft 91, cam 98 will engage trigger arm 96 of micro switch 94 upon upward movement of spring link 87 for effecting an opening of said micro switch 94, as may best be seen in FIGURES 8, 9 and 10. Upon rotation of shaft 91 downwardly through an arc of 180 degrees, cam 98 will effect an opening of micro switch 95 by engaging trigger arm 97 thus allowing micro switch 94 through its normal bias to return to circuit closing condition. Thus, to recapitulate, micro switch 94 will be closed when rod 63 is in downward position (FIGURES 5, 6 and 7), while micro switch 95 will be closed when rod 63 is in upward position (FIGURES 8, 9 and 10).

Provided for disposition within the neck 76 of housing H is an annular guide 105 mounted upon a transverse rod 106 journalled at its ends and openings provided in opposed portions of said neck 76, as at 107, 107', to permit rotative movement of said guide 105. Extending through guide 105 is a passage 108 for receiving a sleeve 109, one end portion of which projects inwardly beyond guide 105 and into housing H having a pulley 110 mounted upon its lower extremity; said pulley 110 is mounted upon a shaft 111 journalled at its ends within suitable openings provided in the opposed side faces of the lower end of said sleeve 109. Sleeve 109 is cut away in its lower portion, as at 112, to allow extension therebeyond of a portion of pulley 110 and permit movement downwardly therefrom of the lower end of a cable or tension element 113, which latter is directed toward the proximate portion of end wall 74 of housing H by means of a guide 114 fixed on said wall 74. Cable 113 continues downwardly along said wall 74 for connection by means of an adaptor 115 to the upper end of a screw 116, which at its opposite end extends through an opening 117 in a bracket 118 fixed on said wall 74. Screw 116 carries an enlarged head 119 at its lower extremity for abutment against the bracket 118. It is apparent that by suitable manipulation of screw 116 within adaptor 115, the effective length of cable 113 may be adjusted.

Upwardly of pulley 110, cable 113 progresses through sleeve 109 and beyond the upper end thereof for reception within an enlarged casing 120 within which is disposed a segmental guide 121 for directing said cable about its upper arcuate surface for ultimate direction downwardly toward a forearm 122; said sleeve 109 being suitably joined to guide 121 by an insert member of U-shape cross section as indicated at 109'. Disposed within said forearm 122 is a short sleeve 123 which is of general U-shape in cross section and which is made unitarily with segmental guide 121 through a connection body portion 124. The upper end of sleeve 123 terminates spacedly from the proximate end of segmental guide 121 for disposition in the spacing of a short plastic tube or sleeve 125 for engaging the end of cable 113; said tube 125 being of such cross section as to prevent inadvertent displacement of cable 113 from guide 121. Body portion 124 is suitably carried upon a transverse pivot, as indicated generally at 126, provided width-wise of housing 120 so as to allow for rocking of forearm 122 in a horizontal plane with respect to sleeve 109. Pivot 126 comprises a tubular pin 127 internally threaded to receive retaining screws 128, 128' having smooth surface neck portions, as at 129, within openings provided at the opposite faces of housing 120, as at 130. A sleeve or bushing 131 surrounds pin 127 to form a suitable bearing therefor.

In its upper portion, in its side directed toward forearm 122, sleeve 109 is provided with an opening 132 for extension therethrough of a conductive cable 133 carrying a plurality of electrical leads, as indicated at 134; said cable is directed upwardly into housing 120, beneath pivot 126, for direction downwardly into forearm 122 through the open upper end of sleeve 123 for ultimate extension beyond forearm 122 for connection to iron 2. As will be observed in FIGURE 11, sufficient slack is provided in conductive cable 133 for accommodating the various potential dispositions of forearm 122 with respect to sleeve 109. The leads 134 within cable 133 permit of connection to micro switches 94, 95 as by leads 135 and 136 (see FIGURE 34) with a suitable lead also being provided, as indicated at 137, for connecting the iron control switch 138 to a source of power.

The lower end of forearm 122 carries an adaptor 139, as by a rivet 140, which adaptor embodies a socket 141 for receiving a ball 142 in joint formation. Said ball 142 incorporates a short stem 143 which is threadedly secured to the upper end, as at 144, of an iron support arm 145; said latter, at its opposite end, is engaged to a mounting bracket 146 for securement to iron 2. Iron support arm 146, at its lower end, and upon its side opposite plate 146, mounts a latch element 147 comprising a lug 148 having a pin 149 extending transversely therethrough and projecting at its ends therebeyond; said latch element being receivable within a bayonet-type slot 150 formed in a plate 151 secured, as by screws, upon the confronting portion of sleeve 109 for the purpose of maintaining support arm 145 with the carried iron 2 in a position of rest when the iron is not in usage. There may be also mounted on the lower end of support arm 145 a housing 152 for a spring pressed ball type lock 153 for securing stem 143 together with forearm 122 in selected axial relationship with respect to sleeve 109.

Referring now to FIGURE 34 which illustrates the control circuit of the present invention, the iron heating element is shown diagrammatically at 154 with its temperature control at 155. Iron control switch 138 may be of the mercury type so that when the iron is disposed in horizontal position the main switch will be closed and when the iron is disposed in vertical disposition the circuit will automatically open. D indicates a switch, as of the double pole type, having poles 156, 157, which switch is located upon the handle of iron 2 for convenient engagement by the operator's hand when the iron is in use. Control lever 158 will normally be urged into circuit closing engagement with pole 156 through bias of a spring (not shown) so that the circuit to pole or contact 157 is interrupted or open. Motor M and iron 2 are adapted to be energized from a conventional source of power, such as the usual household supply through conductor 100 plugged into the customary receptacle. One side of motor M is connected to said power source indicated at P, and the other side is connected in parallel relationship by conductor 99 to micro switches 94, 95.

With iron 2 being swung into horizontal position, switch 138, if it is of the mercury type, will automatically close thereby connecting iron 2 with the source of electricity. If said switch is not of the mercury type it may, of course, be closed by appropriate manipulation. With lever 158 of switch D biased into closed engagement with pole 156, micro switch 94 will be in normally closed condition (FIGURES 5, 6, 7) wherein iron 2 will be in raised position with respect to the now horizontally presented ironing board 1 and, hence, out of contact therewith as during a period of temporary non-usage, such as during which the operator may be altering the position of the work. Upon operation of switch D so as to effect circuit closing engagement with pole 157, motor M is energized so as to effect rotation of shaft 91 with consequent movement of cam 98 into engagement with trigger arm 96 of micro switch 94 so as to effect circuit opening of the latter while permitting micro switch 95 to move into closed condition through its inherent bias. By such action, as above described, link 87 is pulled upwardly to effect a raising of rod 63 with consequent lowering of iron 2 into operative position upon the work located upon ironing board 1. This condition will thus obtain until the user causes switch D to effect circuit closure with pole 156 with consequent swinging of cam 98 through a 180 degree arc by reason of rotation of shaft 91 for return to the condition depicted in FIGURE 34 with resultant elevation of iron 2.

It is to be particularly observed that spring 103 effectively serves as a unique counterweight for iron 2 and the linkage system associated therewith so that motor M may be relatively small.

Thus, in view of the foregoing it is readily apparent that ironing apparatus A is a most uniquely compact device which comprehends components movable in a facile manner between operative and inoperative condition so as to be readily handled by the average housewife. Furthermore, the operational components of ironing apparatus A are relatively simple so as to conduce to reliable operation of the system without danger of breakdown.

It should be understood that changes and modifications in the formation, construction, and arrangement and combination of the several parts of the mobile ironing apparatus may be made and substituted for these herein shown and described without departing from the nature and principle of my invention.

Having thus described my invention, what I claim and desire to obtain by Letters Patent is:

1. An ironing apparatus comprising a first support element having first and second legs, an ironing board hingedly secured to said first leg, said second leg being parallel to said first leg for disposition laterally outwardly of said ironing board, a linkage system carried on said second leg, and an iron supported from said linkage system.

2. An ironing apparatus as defined in claim 1 and further characterized by a second support element having a first upright engageable with said ironing board for supporting same in horizontal disposition and a second upright pivotally engaged to said second leg for swingable movement about an axis parallel thereto.

3. An ironing apparatus as defined in claim 2 and further characterized by said first support element having a transverse portion integral with said first and second legs and presented for disposition upon the support surface, said second support element having a transverse portion integral with said first and second uprights.

4. An ironing apparatus as defined in claim 3 and further characterized by roller members carried upon said second support element for peripherally engaging a support surface for rendering the apparatus mobile.

5. An ironing apparatus as defined in claim 3 and further characterized by a third support element comprising a vertical section and upper and lower horizontal sections, said vertical section of said third support element being pivotally engaged to said first leg of said first support element for swingable movement about an axis parallel thereto.

6. An ironing apparatus as defined in claim 5 and further characterized by said third support element being swingable between inoperative position wherein said upper and lower horizontal sections are presented transversely of said ironing board and operative position wherein the same are presented in substantially axially normal relationship to the transverse axis of said ironing board, said third support element being of such height so as to present the upper horizontal section in underlying supporting relationship to said ironing board when in horizontal, operative position.

7. An ironing apparatus as defined in claim 6 and further characterized by a latch member carried on said ironing board for presentation in immediate lateral relationship to the vertical section of said third support element when the board is in operative position so as to prevent inadvertent swinging of said third support element into inoperative disposition.

8. An ironing apparatus as defined in claim 6 and further characterized by a detent member carried on said third support element proximate the point of joining of said vertical section and said upper horizontal section for extension outwardly thereof, and a latch element mounted on said ironing board for abutment against said detent when said ironing board is in inoperative position so as to prevent inadvertent accidental swinging of said ironing board.

9. An ironing apparatus as defined in 8 and further characterized by a fourth support element having an upper vertical portion swingably engaged to said second leg of said first support element and a lower horizontal portion for disposition upon the support surface, means interconnecting said lower horizontal portion of said fourth support element and the lower horizontal section of the third support element so that upon swingable movement of said latter about said first leg of said first support element, said fourth support element will be correspondingly swingable about said second leg of said first support element.

References Cited

UNITED STATES PATENTS

| | | | |
|---|---|---|---|
| 2,661,553 | 12/1953 | Foster | 38—107 |
| 2,939,230 | 6/1960 | Foster | 38—30 |

MERVIN STEIN, Primary Examiner

GEORGE L. LARKIN, Assistant Examiner

U.S. Cl. X.R.

38—107